US010765956B2

(12) United States Patent
Bojja et al.

(10) Patent No.: US 10,765,956 B2
(45) Date of Patent: Sep. 8, 2020

(54) NAMED ENTITY RECOGNITION ON CHAT DATA

(71) Applicant: MZ IP Holdings, LLC, Palo Alto, CA (US)

(72) Inventors: Nikhil Bojja, Mountain View, CA (US); Shivasankari Kannan, Sunnyvale, CA (US); Pidong Wang, Mountain View, CA (US)

(73) Assignee: Machine Zone Inc., Palo Alto, CA (US)

( * ) Notice: Subject to any disclaimer, the term of this patent is extended or adjusted under 35 U.S.C. 154(b) by 443 days.

(21) Appl. No.: 14/990,540

(22) Filed: Jan. 7, 2016

(65) Prior Publication Data

US 2017/0197152 A1 Jul. 13, 2017

(51) Int. Cl.
*A63F 13/87* (2014.01)
*G06F 40/40* (2020.01)
(Continued)

(52) U.S. Cl.
CPC ............ *A63F 13/87* (2014.09); *G06F 40/216* (2020.01); *G06F 40/284* (2020.01);
(Continued)

(58) Field of Classification Search
CPC ......... G06F 2203/0338; G06F 3/03545; G06F 17/2247; G06F 17/227; G06F 17/2836;
(Continued)

(56) References Cited

U.S. PATENT DOCUMENTS 4,460,973 A 7/1984 Tanimoto et al.
4,502,128 A 2/1985 Okajima et al.
(Continued)

FOREIGN PATENT DOCUMENTS

JP 2000-194696 A 7/2000
JP 2002-041432 A 2/2002
(Continued)

OTHER PUBLICATIONS

Bender, O. et al., "Maximum Entropy Models for Named Entity Recognition," CONLL '03 Proc. of the 7th Conference on Natural language Learning at HLT-NAACL; vol. 4, pp. 148-151; May 31, 2003.
(Continued)

*Primary Examiner* — Abdelali Serrou
(74) *Attorney, Agent, or Firm* — Goodwin Procter LLP

(57) ABSTRACT

Methods, systems, and apparatus, including computer programs encoded on a computer storage medium, for receiving a plurality of word strings in a first language, each received word string comprising a plurality of words, identifying one or more named entities in each received word string using a statistical classifier that was trained using training data comprising a plurality of features, wherein one of the features is a word shape feature that comprises a respective token for each letter of a respective word wherein each token signifies a case of the letter or whether the letter is a digit, and translating the received word strings from the first language to a second language including preserving the respective identified named entities in each received word string during translation.

30 Claims, 3 Drawing Sheets

(51) Int. Cl.
   *G06F 40/58*      (2020.01)
   *G06F 40/216*     (2020.01)
   *G06F 40/284*     (2020.01)
   *G06F 40/295*     (2020.01)

(52) U.S. Cl.
   CPC ............ *G06F 40/295* (2020.01); *G06F 40/40* (2020.01); *G06F 40/58* (2020.01)

(58) Field of Classification Search
   CPC .. G06F 17/289; G06F 17/30867; G06F 40/40; G06F 40/58; G06F 40/216; G06F 40/284; G06F 40/295; G06F 17/2715; G06F 17/277; G06F 17/278; G06F 17/28; A63F 13/87
   See application file for complete search history.

(56) References Cited

U.S. PATENT DOCUMENTS

| | | |
|---|---|---|
| 4,706,212 A | 11/1987 | Toma |
| 5,289,375 A | 2/1994 | Fukumochi et al. |
| 5,313,534 A | 5/1994 | Burel |
| 5,526,259 A | 6/1996 | Kaji |
| 5,603,031 A * | 2/1997 | White ............... G06F 9/465 719/317 |
| 5,873,055 A | 2/1999 | Okunishi |
| 5,884,246 A | 3/1999 | Boucher et al. |
| 5,991,710 A | 11/1999 | Papineni et al. |
| 6,125,362 A | 9/2000 | Elworthy |
| 6,157,905 A | 12/2000 | Powell |
| 6,167,369 A | 12/2000 | Schulze |
| 6,182,029 B1 | 1/2001 | Friedman |
| 6,269,189 B1 | 7/2001 | Chanod |
| 6,278,967 B1 | 8/2001 | Akers et al. |
| 6,278,969 B1 | 8/2001 | King et al. |
| 6,285,978 B1 | 9/2001 | Bernth et al. |
| 6,304,841 B1 | 10/2001 | Berger et al. |
| 6,415,250 B1 | 7/2002 | van den Akker |
| 6,425,119 B1 | 7/2002 | Jones et al. |
| 6,722,989 B1 | 4/2004 | Hayashi |
| 6,799,303 B2 | 9/2004 | Blumberg |
| 6,801,190 B1 | 10/2004 | Robinson et al. |
| 6,848,080 B1 | 1/2005 | Lee et al. |
| 6,993,473 B2 | 1/2006 | Cartus |
| 6,996,520 B2 | 2/2006 | Levin |
| 7,165,019 B1 | 1/2007 | Lee et al. |
| 7,174,289 B2 | 2/2007 | Sukehiro |
| 7,278,100 B1 | 10/2007 | Ehrman |
| 7,451,188 B2 | 11/2008 | Cheung et al. |
| 7,475,343 B1 | 1/2009 | Mielenhausen |
| 7,478,033 B2 | 1/2009 | Wu et al. |
| 7,533,013 B2 | 5/2009 | Marcu |
| 7,539,619 B1 | 5/2009 | Seligman et al. |
| 7,822,768 B2 | 10/2010 | Maymir-Ducharme et al. |
| 7,895,576 B2 | 2/2011 | Chang et al. |
| 7,912,852 B1 | 3/2011 | McElroy |
| 7,970,598 B1 | 6/2011 | Flanagan et al. |
| 8,010,338 B2 | 8/2011 | Thorn |
| 8,010,474 B1 | 8/2011 | Bill |
| 8,027,438 B2 | 9/2011 | Daigle et al. |
| 8,112,497 B1 | 2/2012 | Gouqousis et al. |
| 8,145,472 B2 | 3/2012 | Shore et al. |
| 8,170,868 B2 | 5/2012 | Gamon et al. |
| 8,244,567 B2 | 8/2012 | Estill |
| 8,270,606 B2 | 9/2012 | Caskey et al. |
| 8,311,800 B1 | 11/2012 | Delaney et al. |
| 8,326,601 B2 | 12/2012 | Ribeiro et al. |
| 8,380,488 B1 | 2/2013 | Liu et al. |
| 8,392,173 B2 | 3/2013 | Davis et al. |
| 8,442,813 B1 | 5/2013 | Popat |
| 8,468,149 B1 | 6/2013 | Lung et al. |
| 8,473,555 B2 | 6/2013 | Lai et al. |
| 8,489,388 B2 * | 7/2013 | Bonnet ............. G06F 40/205 704/9 |
| 8,510,328 B1 | 8/2013 | Hatton |
| 8,533,203 B2 * | 9/2013 | Chaudhuri ........... G06F 40/295 707/749 |
| 8,543,374 B2 | 9/2013 | Dymetman |
| 8,566,306 B2 | 10/2013 | Jones |
| 8,606,297 B1 | 12/2013 | Simkhai et al. |
| 8,606,800 B2 | 12/2013 | Lagad et al. |
| 8,626,486 B2 | 1/2014 | Och et al. |
| 8,655,644 B2 | 2/2014 | Kanevsky et al. |
| 8,671,019 B1 | 3/2014 | Barclay et al. |
| 8,682,529 B1 * | 3/2014 | Church .............. H04L 51/38 701/36 |
| 8,688,433 B2 | 4/2014 | Davis et al. |
| 8,688,451 B2 | 4/2014 | Grost et al. |
| 8,738,355 B2 | 5/2014 | Gupta et al. |
| 8,762,128 B1 | 6/2014 | Brants et al. |
| 8,788,259 B1 | 7/2014 | Buryak et al. |
| 8,818,791 B2 | 8/2014 | Xiao et al. |
| 8,825,467 B1 | 9/2014 | Chen et al. |
| 8,825,469 B1 | 9/2014 | Duddu et al. |
| 8,832,204 B1 | 9/2014 | Gailloux et al. |
| 8,838,437 B1 | 9/2014 | Buryak et al. |
| 8,886,518 B1 * | 11/2014 | Wang ................ G06F 17/2818 704/1 |
| 8,914,395 B2 | 12/2014 | Jiang |
| 8,918,308 B2 | 12/2014 | Caskey et al. |
| 8,928,591 B2 | 1/2015 | Swartz et al. |
| 8,935,147 B2 | 1/2015 | Stern et al. |
| 8,990,064 B2 | 3/2015 | Marcu et al. |
| 8,990,068 B2 | 3/2015 | Orsini et al. |
| 8,996,352 B2 | 3/2015 | Orsini et al. |
| 8,996,353 B2 | 3/2015 | Orsini et al. |
| 8,996,355 B2 | 3/2015 | Orsini et al. |
| 9,031,828 B2 | 5/2015 | Leydon et al. |
| 9,031,829 B2 | 5/2015 | Leydon et al. |
| 9,141,607 B1 | 9/2015 | Lee et al. |
| 9,231,898 B2 | 1/2016 | Orsini et al. |
| 9,245,278 B2 | 1/2016 | Orsini et al. |
| 9,298,703 B2 | 3/2016 | Leydon et al. |
| 9,336,206 B1 | 5/2016 | Orsini et al. |
| 9,348,818 B2 | 5/2016 | Leydon et al. |
| 9,372,848 B2 | 6/2016 | Bojja et al. |
| 9,448,996 B2 | 9/2016 | Orsini et al. |
| 9,535,896 B2 | 1/2017 | Bojja et al. |
| 9,600,473 B2 | 3/2017 | Leydon et al. |
| 9,665,571 B2 | 5/2017 | Leydon et al. |
| 2001/0020225 A1 | 9/2001 | Zerber |
| 2001/0029455 A1 | 10/2001 | Chin et al. |
| 2002/0022954 A1 | 2/2002 | Shimohata et al. |
| 2002/0029146 A1 | 3/2002 | Nir |
| 2002/0037767 A1 | 3/2002 | Ebin |
| 2002/0099744 A1 * | 7/2002 | Coden ............... G06F 17/27 715/267 |
| 2002/0152063 A1 | 10/2002 | Tokieda et al. |
| 2002/0169592 A1 | 11/2002 | Aityan |
| 2002/0198699 A1 | 12/2002 | Greene et al. |
| 2003/0009320 A1 | 1/2003 | Furuta |
| 2003/0033152 A1 | 2/2003 | Cameron |
| 2003/0033595 A1 * | 2/2003 | Takagi ............... G06F 17/5045 717/143 |
| 2003/0046350 A1 | 3/2003 | Chintalapati et al. |
| 2003/0101044 A1 | 5/2003 | Krasnov |
| 2003/0125927 A1 | 7/2003 | Seme |
| 2003/0176995 A1 | 9/2003 | Sukehiro |
| 2003/0191626 A1 * | 10/2003 | Al-Onaizan ......... G06F 17/2223 704/8 |
| 2004/0030750 A1 | 2/2004 | Moore et al. |
| 2004/0030781 A1 | 2/2004 | Etesse et al. |
| 2004/0044517 A1 | 3/2004 | Palmquist |
| 2004/0093567 A1 | 5/2004 | Schabes et al. |
| 2004/0102201 A1 | 5/2004 | Levin |
| 2004/0102956 A1 | 5/2004 | Levin |
| 2004/0102957 A1 | 5/2004 | Levin |
| 2004/0158471 A1 | 8/2004 | Davis et al. |
| 2004/0205671 A1 | 10/2004 | Sukehiro et al. |
| 2004/0210443 A1 | 10/2004 | Kuhn et al. |
| 2004/0215647 A1 | 10/2004 | Farn et al. |
| 2004/0243409 A1 | 12/2004 | Nakagawa |
| 2004/0267527 A1 | 12/2004 | Creamer et al. |

(56) References Cited

U.S. PATENT DOCUMENTS

| | | | |
|---|---|---|---|
| 2005/0038643 A1* | 2/2005 | Koehn | G06F 40/44 704/2 |
| 2005/0076240 A1 | 4/2005 | Appleman | |
| 2005/0102130 A1 | 5/2005 | Quirk et al. | |
| 2005/0160075 A1 | 7/2005 | Nagahara | |
| 2005/0165642 A1 | 7/2005 | Brouze et al. | |
| 2005/0171758 A1 | 8/2005 | Palmquist | |
| 2005/0197829 A1 | 9/2005 | Okumura | |
| 2005/0209844 A1 | 9/2005 | Wu et al. | |
| 2005/0234702 A1 | 10/2005 | Komiya | |
| 2005/0251384 A1 | 11/2005 | Yang | |
| 2005/0283540 A1 | 12/2005 | Fux | |
| 2005/0288920 A1 | 12/2005 | Green et al. | |
| 2006/0015812 A1 | 1/2006 | Cunningham et al. | |
| 2006/0053203 A1 | 3/2006 | Mijatovic | |
| 2006/0101021 A1 | 5/2006 | Davis et al. | |
| 2006/0133585 A1 | 6/2006 | Daigle et al. | |
| 2006/0136223 A1 | 6/2006 | Brun et al. | |
| 2006/0167992 A1 | 7/2006 | Cheung et al. | |
| 2006/0173839 A1 | 8/2006 | Knepper et al. | |
| 2006/0206309 A1 | 9/2006 | Curry et al. | |
| 2006/0217955 A1* | 9/2006 | Nagao | G06F 40/58 704/2 |
| 2006/0242232 A1 | 10/2006 | Murillo et al. | |
| 2006/0247917 A1 | 11/2006 | Fux et al. | |
| 2006/0271352 A1 | 11/2006 | Nikitin et al. | |
| 2006/0287848 A1 | 12/2006 | Li et al. | |
| 2007/0011132 A1* | 1/2007 | Zhou | G06F 17/30864 |
| 2007/0011235 A1 | 1/2007 | Mutikainen et al. | |
| 2007/0016399 A1 | 1/2007 | Gao et al. | |
| 2007/0038758 A1 | 2/2007 | Mu et al. | |
| 2007/0050182 A1 | 3/2007 | Sneddon et al. | |
| 2007/0077975 A1 | 4/2007 | Warda | |
| 2007/0088793 A1 | 4/2007 | Landsman | |
| 2007/0124133 A1 | 5/2007 | Wang et al. | |
| 2007/0124202 A1 | 5/2007 | Simons | |
| 2007/0129935 A1 | 6/2007 | Uchimoto et al. | |
| 2007/0130258 A1 | 6/2007 | Almberg | |
| 2007/0143410 A1 | 6/2007 | Kraft et al. | |
| 2007/0168450 A1 | 7/2007 | Prajapat et al. | |
| 2007/0218997 A1 | 9/2007 | Cho | |
| 2007/0219774 A1 | 9/2007 | Quirk et al. | |
| 2007/0219776 A1 | 9/2007 | Gamon et al. | |
| 2007/0219777 A1 | 9/2007 | Chu et al. | |
| 2007/0276814 A1 | 11/2007 | Williams | |
| 2007/0294076 A1 | 12/2007 | Shore et al. | |
| 2008/0005319 A1 | 1/2008 | Anderholm et al. | |
| 2008/0005325 A1 | 1/2008 | Wynn et al. | |
| 2008/0052289 A1 | 2/2008 | Kolo et al. | |
| 2008/0065369 A1 | 3/2008 | Fux et al. | |
| 2008/0097745 A1 | 4/2008 | Bagnato et al. | |
| 2008/0097746 A1 | 4/2008 | Tagata et al. | |
| 2008/0120374 A1 | 5/2008 | Kawa et al. | |
| 2008/0126077 A1 | 5/2008 | Thorn | |
| 2008/0147380 A1 | 6/2008 | Barliga et al. | |
| 2008/0147408 A1 | 6/2008 | Da Palma et al. | |
| 2008/0176655 A1 | 7/2008 | James et al. | |
| 2008/0177528 A1 | 7/2008 | Drewes | |
| 2008/0183459 A1 | 7/2008 | Simonsen et al. | |
| 2008/0208596 A1 | 8/2008 | Heinze | |
| 2008/0243834 A1 | 10/2008 | Rieman et al. | |
| 2008/0249760 A1 | 10/2008 | Marcu et al. | |
| 2008/0270553 A1 | 10/2008 | Mu | |
| 2008/0274694 A1 | 11/2008 | Castell et al. | |
| 2008/0281577 A1 | 11/2008 | Suzuki | |
| 2008/0313534 A1 | 12/2008 | Cheung et al. | |
| 2008/0320086 A1 | 12/2008 | Callanan et al. | |
| 2009/0011829 A1 | 1/2009 | Yang | |
| 2009/0031006 A1 | 1/2009 | Johnson | |
| 2009/0049513 A1 | 2/2009 | Root et al. | |
| 2009/0055175 A1 | 2/2009 | Terrell, II et al. | |
| 2009/0068984 A1 | 3/2009 | Burnett | |
| 2009/0100141 A1 | 4/2009 | Kirkland et al. | |
| 2009/0106695 A1 | 4/2009 | Perry et al. | |
| 2009/0125477 A1 | 5/2009 | Lu et al. | |
| 2009/0204400 A1 | 8/2009 | Shields et al. | |
| 2009/0204596 A1* | 8/2009 | Brun | G06F 17/278 707/5 |
| 2009/0221372 A1 | 9/2009 | Casey et al. | |
| 2009/0234635 A1 | 9/2009 | Bhatt et al. | |
| 2009/0271212 A1 | 10/2009 | Savjani et al. | |
| 2009/0276500 A1 | 11/2009 | Karmarkar | |
| 2009/0324005 A1 | 12/2009 | Georgiev et al. | |
| 2010/0015581 A1 | 1/2010 | DeLaurentis | |
| 2010/0036661 A1 | 2/2010 | Boucher et al. | |
| 2010/0088085 A1 | 4/2010 | Jeon et al. | |
| 2010/0099444 A1 | 4/2010 | Coulter | |
| 2010/0114559 A1 | 5/2010 | Kim et al. | |
| 2010/0138210 A1 | 6/2010 | Seo et al. | |
| 2010/0145900 A1 | 6/2010 | Zheng et al. | |
| 2010/0179803 A1* | 7/2010 | Sawaf | G06F 40/40 704/2 |
| 2010/0180199 A1 | 7/2010 | Wu et al. | |
| 2010/0204981 A1 | 8/2010 | Ribeiro et al. | |
| 2010/0235751 A1 | 9/2010 | Stewart | |
| 2010/0241482 A1 | 9/2010 | Knyphausen et al. | |
| 2010/0261534 A1 | 10/2010 | Lee et al. | |
| 2010/0268730 A1 | 10/2010 | Kazeoka | |
| 2010/0293230 A1 | 11/2010 | Lai et al. | |
| 2010/0312545 A1 | 12/2010 | Sites | |
| 2010/0324894 A1 | 12/2010 | Potkonjak | |
| 2011/0022381 A1 | 1/2011 | Gao et al. | |
| 2011/0035210 A1* | 2/2011 | Rosenfeld | G06F 17/278 704/9 |
| 2011/0040824 A1 | 2/2011 | Harm | |
| 2011/0055233 A1* | 3/2011 | Weber | G06F 17/30625 707/752 |
| 2011/0066421 A1 | 3/2011 | Lee et al. | |
| 2011/0071817 A1 | 3/2011 | Siivola | |
| 2011/0077933 A1 | 3/2011 | Miyamoto et al. | |
| 2011/0077934 A1 | 3/2011 | Kanevsky et al. | |
| 2011/0082683 A1 | 4/2011 | Soricut et al. | |
| 2011/0082684 A1 | 4/2011 | Soricut et al. | |
| 2011/0098117 A1 | 4/2011 | Tanaka | |
| 2011/0184736 A1 | 7/2011 | Slotznick | |
| 2011/0191096 A1 | 8/2011 | Sarikaya et al. | |
| 2011/0202334 A1 | 8/2011 | Abir | |
| 2011/0202344 A1 | 8/2011 | Meyer et al. | |
| 2011/0213607 A1 | 9/2011 | Onishi | |
| 2011/0219084 A1 | 9/2011 | Borra et al. | |
| 2011/0238406 A1 | 9/2011 | Chen et al. | |
| 2011/0238411 A1 | 9/2011 | Suzuki | |
| 2011/0239278 A1 | 9/2011 | Downey et al. | |
| 2011/0246881 A1 | 10/2011 | Kushman et al. | |
| 2011/0307241 A1 | 12/2011 | Waibel et al. | |
| 2011/0307356 A1 | 12/2011 | Wiesinger | |
| 2011/0307495 A1 | 12/2011 | Shoshan | |
| 2011/0313779 A1 | 12/2011 | Herzog et al. | |
| 2011/0320019 A1 | 12/2011 | Lanciani et al. | |
| 2012/0072204 A1 | 3/2012 | Nasri et al. | |
| 2012/0109631 A1 | 5/2012 | Gopal et al. | |
| 2012/0156668 A1 | 6/2012 | Zelin | |
| 2012/0173502 A1 | 7/2012 | Kumar et al. | |
| 2012/0179449 A1 | 7/2012 | Raskino et al. | |
| 2012/0179451 A1 | 7/2012 | Miyamoto et al. | |
| 2012/0191445 A1 | 7/2012 | Markman et al. | |
| 2012/0209852 A1 | 8/2012 | Dasgupta et al. | |
| 2012/0226491 A1 | 9/2012 | Yamazaki et al. | |
| 2012/0233191 A1 | 9/2012 | Ramanujam | |
| 2012/0240039 A1 | 9/2012 | Walker et al. | |
| 2012/0246564 A1 | 9/2012 | Kolo | |
| 2012/0253785 A1 | 10/2012 | Hamid et al. | |
| 2012/0262296 A1 | 10/2012 | Bezar | |
| 2012/0265518 A1 | 10/2012 | Lauder | |
| 2012/0277003 A1 | 11/2012 | Eliovits et al. | |
| 2012/0290288 A1* | 11/2012 | Ait-Mokhtar | G06F 17/271 704/9 |
| 2012/0303355 A1 | 11/2012 | Liu et al. | |
| 2013/0006954 A1 | 1/2013 | Nikoulina et al. | |
| 2013/0073276 A1* | 3/2013 | Sarikaya | G06F 40/58 704/2 |
| 2013/0084976 A1 | 4/2013 | Kumaran et al. | |
| 2013/0085747 A1 | 4/2013 | Li et al. | |
| 2013/0091429 A1 | 4/2013 | Weng et al. | |

(56) References Cited

U.S. PATENT DOCUMENTS

| | | |
|---|---|---|
| 2013/0096911 A1 | 4/2013 | Beaufort et al. |
| 2013/0103493 A1 | 4/2013 | Gao et al. |
| 2013/0124185 A1 | 5/2013 | Sarr et al. |
| 2013/0124186 A1 | 5/2013 | Donabedian et al. |
| 2013/0130792 A1 | 5/2013 | Crocker et al. |
| 2013/0138428 A1 | 5/2013 | Chandramouli et al. |
| 2013/0144599 A1 | 6/2013 | Davis et al. |
| 2013/0151237 A1 | 6/2013 | Hyde |
| 2013/0173247 A1 | 7/2013 | Hodson |
| 2013/0197896 A1 | 8/2013 | Chalabi et al. |
| 2013/0211821 A1 | 8/2013 | Tseng et al. |
| 2013/0226553 A1 | 8/2013 | Ji |
| 2013/0253834 A1 | 9/2013 | Slusar |
| 2013/0262080 A1 | 10/2013 | Marciano et al. |
| 2013/0297316 A1 | 11/2013 | Cragun et al. |
| 2013/0339859 A1 | 12/2013 | Hardi |
| 2014/0006003 A1 | 1/2014 | Soricut et al. |
| 2014/0058807 A1 | 2/2014 | Altberg et al. |
| 2014/0142917 A1 | 5/2014 | D'Penha |
| 2014/0163951 A1* | 6/2014 | Nikoulina ............ G06F 17/2809 704/4 |
| 2014/0188453 A1 | 7/2014 | Marcu et al. |
| 2014/0199975 A1 | 7/2014 | Lou et al. |
| 2014/0200878 A1 | 7/2014 | Mylonakis et al. |
| 2014/0208367 A1 | 7/2014 | DeWeese et al. |
| 2014/0330760 A1 | 11/2014 | Meier et al. |
| 2014/0379329 A1 | 12/2014 | Dong et al. |
| 2015/0006148 A1 | 1/2015 | Goldszmit et al. |
| 2015/0088511 A1* | 3/2015 | Bharadwaj ............ G10L 15/183 704/244 |
| 2015/0127322 A1 | 5/2015 | Clark |
| 2015/0161104 A1 | 6/2015 | Buryak et al. |
| 2015/0161114 A1 | 6/2015 | Buryak et al. |
| 2015/0161227 A1 | 6/2015 | Buryak et al. |
| 2015/0186355 A1 | 7/2015 | Baldwin et al. |
| 2015/0199333 A1* | 7/2015 | Neakhay ............... G06F 17/278 704/9 |
| 2015/0363394 A1 | 12/2015 | Marciano et al. |
| 2016/0036740 A1 | 2/2016 | Barber et al. |
| 2016/0125872 A1 | 5/2016 | Golipour et al. |
| 2016/0179882 A1* | 6/2016 | Glover ................ G06F 16/2452 707/756 |
| 2016/0267070 A1 | 9/2016 | Bojja et al. |
| 2016/0336008 A1* | 11/2016 | Menezes ............... G06F 40/295 |
| 2017/0060835 A1* | 3/2017 | Radford ............. G06K 9/00463 |
| 2017/0132206 A1* | 5/2017 | Kumagai ............... G06F 40/154 |
| 2017/0300453 A1 | 10/2017 | Shen et al. |

FOREIGN PATENT DOCUMENTS

| | | |
|---|---|---|
| JP | 2003-054841 A | 2/2003 |
| JP | 2003-529845 | 10/2003 |
| JP | 2004-252881 A | 9/2004 |
| JP | 2006-221658 A | 8/2006 |
| JP | 2006-277103 A | 10/2006 |
| JP | 2006-302091 A | 11/2006 |
| JP | 2006-350628 A | 12/2006 |
| JP | 2009-134344 A | 6/2009 |
| JP | 2009-140073 A | 6/2009 |
| JP | 2010-129057 A | 6/2010 |
| JP | 2010-152785 A | 7/2010 |
| JP | 2012-103554 A | 5/2012 |
| JP | 2014-519104 A | 8/2014 |
| WO | WO-2009/129315 A1 | 10/2009 |
| WO | WO-2014/124397 A1 | 8/2014 |

OTHER PUBLICATIONS

Bontcheva, K., et al., "TwitIE: An Open-Source Information Extraction Pipeline for Microblog Text," Proc. of the Int'l Conference on Recent Advances in Natural Language Processing, ACL; 8pgs; Sep. 5, 2013.

Brown, Ralf D., "Adding Linguistic Knowledge to a Lexical Example-Based Translation System," Proc. of the 8th Int'l Conference on Theoretical and Methodological Issues in Machine Translation (TMI-99); pp. 22-32; Aug. 1999.

Chieu, H.L. and Ng, H.T., "Named Entity Recognition with a Maximum Entropy Approach," CONLL '03 Proc. of the 7th Conference on Natural language Learning at HLT-NAACL; vol. 4, pp. 160-163; May 31, 2003.

Cunningham, H., et al., "Gate: An Architecture for Development of Robust hit Applications," ACL '02 Proc. of the 40th Annual Meeting on Association for Computational Linguistics; pp. 168-175; Jul. 6, 2002.

Curran, J.R. and Clark, S., "Language Independent Ner using a Maximum Entropy Tagger," CONLL '03 Proc. of the 7th Conference on Natural language Learning at HLT-NAACL; vol. 4, pp. 164-167; May 31, 2003.

Finkel, J., et al., "Incorporating Non-local Information into Information Extraction Systems by Gibbs Sampling," ACL '05 Proc. of the 43rd Annual Meeting on Association for Computational Linguistics , pp. 363-370; Jun. 25, 2005.

Lafferty, J., et al., "Conditional Random Fields: Probabilistic Models for Segmenting and Labeling Sequence Data," ICML '01 Proc. of the Eighteenth International Conference on Machine Learning; pp. 282-289; Jun. 28, 2001.

Minkov, E., et al., "Extracting Personal Names from Email: Applying Named Entity Recognition to Informal Text," HLT '05 Proc. of the Conference on Human Language Technology and Empirical Methods in Natural Language Processing; pp. 443-450; Oct. 6, 2005.

Och, F.J. and Ney, H., "A Systematic Comparison of Various Statistical Alignment Models," Computational Linguistics; 29(1):19-51; Mar. 1, 2003.

Okazaki, N., CRFsuite: A Fast Implementation of Conditional Random Fields (CRFs); accessed on the Internet at http://www.chokkan.org/software/crfsuite/; downloaded Jan. 8, 2016; published Jul. 22, 2015; 4pgs.

Ritter, A., et al, "Named Entity Recognition in Tweets: An Experimental Study," EMNLP '11 Proc. of the Conference on Empirical Methods in Natural Language Processing ; pp. 1524-1536; Jul. 2011.

Sang, E., et al., "Introduction to the CoNLL-2003 Shared Task: Language-independent Named Entity Recognition," CONLL '03 Proc. of the 7th Conference on Natural language Learning at HLT-NAACL; vol. 4, pp. 142-147; May 31, 2003.

U.S. Appl. No. 15/267,595, filed Sep. 16, 2016, Systems and Methods for Multi-User Multi-Lingual Communications.

U.S. Appl. No. 15/433,513, filed Feb. 15, 2017, Systems and Methods for Multi-User Multi-Lingual Communications, Leydon et al.

U.S. Appl. No. 15/586,779, filed May 4, 2017, Systems and Methods for Incentivising User Feedback for Translation Processing, Leydon et al.

U.S. Appl. No. 15/283,646, filed Oct. 3, 2016, Systems and Methods for Languate Detection, Bojja et al.

Ciaramita et al., "Named-Entity Recognition in Novel Domains with External Lexical Knowledge," Proceedings of the NIPS Workshop on Advances in Structured Learning for Text and Speech Processing; Canada; Dec. 9, 2005; abstract, Section 2.

International Search Report and Written Opinion of the International Searching Authority for International Application No. PCT/US2017/012102 dated Apr. 18, 2017 (13 pages).

Examiner's Report for Canadian Application No. 2,913,984; dated Oct. 19, 2016; 5 pgs.

Office Action (Translated) in Korean Patent Application No. 10-2016-7000062; dated Oct. 14, 2016; 6 pgs.

Written Opinion of the Austrian Patent Office in Singapore App. No. 11201509840Y dated Mar. 1, 2016; 12pgs.

Ahmed, B., et al., "Language Identification from Text Using n-gram Based Cumulative Frequency Addition," In Proceedings of Student/Faculty Research Day, CSIS, Pace University; pp. 12.1-12.8; May 2004.

Aikawa et al., "The Impact of Crowdsourcing Post-editing with the Collaborative Translation Framework," JapTAL Oct. 22-24, 2012; LNAI; 7614:1-10.

(56) References Cited

OTHER PUBLICATIONS

Ambati et al., "Collaborative Workflow for Crowdsourcing Translation," Proc. of the ACM 2012 conf. on Computer Supported Cooperative Work, ACM; 1191-1194; Feb. 11-15, 2012.
Baldwin, T. and Lui, M., "Language identification: The Long and the Short of the Matter," In Proceedings of NAACL-HLT; pp. 229-237; Jun. 2010.
Bergsma, et al., "Language Identification for Creating Language-specific Twitter Collections," In Proceedings of the Second Workshop on Language in Social Media; pp. 65-74; Jun. 2012.
Callison-Burch et al., "Creating Speech and Language Data with Amazon's Mechanical Turk", Proceedings of the NAACL HLT 2010 Workshop on Creating Speech and Language Data with Amazon's Mechanical Turk; 1-12, Jun. 6, 2010.
Callison-Burch, C., "Fast, Cheap, and Creative: Evaluating Translation Quality Using Amazon's Mechanical Turk," Proceedings of the 2009 Conference on Empirical Methods in Natural Language Processing, pp. 286-295, Singapore, Aug. 6-7, 2009.
Carter, et al., "Microblog Language Identification: Overcoming the Limitations of Short, Unedited and Idiomatic Text," Language Resources and Evaluation; 47(1): 195-215; Mar. 2013.
Cavnar, W. and Trenkle, J., "N-gram-based Text Categorization," In Proceedings of the Third Symposium on Document Analysis and Information Retrieval; Apr. 1994, 14 pgs.
Ceylan, H. and Kim, Y., "Language Identification of Search Engine Queries," In Proceedings of ACL-IJCNLP; 2:1066-1074; Aug. 2009.
Chang, C. and Lin, C., "LIBSVM: A Library for Support Vector Machines," ACM Transactions on Intelligent Systems and Technology, 2(27):1-39; Apr. 2011.
Dunning, "Statistical Identification of Language," Computing Research Laboratory, New Mexico State University; Mar. 1994, 31 pgs.
Extended European Search Report of the EPO in EP2954522; dated Sep. 7, 2016; 7pgs.
Fan, et al., "LIBLINEAR: A Library for Large Linear Classification," Journal of Machine Learning Research; 9:1871-1874; Aug. 2008.
Foster, et al., "#hardtoparse: POS Tagging and Pursing the Twitterverse," In Proceedings of the AAAI Workshop on Analyzing Microtext; Aug. 2011, 7 pgs.
Gottron, T. and Lipka, N., "A Comparison of Language Identification Approaches on Short, Query-style Texts," In Advances in Information Retrieval; pp. 611-614; Mar. 2010.
Grothe, et al., "A Comparative Study on Language Identification Methods," In Proceedings of LREC; pp. 980-985; May 2008.
Hughes, et al., "Reconsidering Language Identification for Written Language Resources," In Proceedings of LREC; pp. 485-488; May 2006.
Hulin et al., "Applications of Item Response Theory to Analysis of Attitude Scale Translations," American Psychological Association; vol. 67(6); Dec. 1982; 51 pgs.
Int'l Search Report of the ISA/US in PCT/US2014/015632; dated Jul. 8, 2014; 8 pgs.
Partial Int'l Search Report of the ISA/EP in PCT/US2014/040676; dated Feb. 17, 2015; 5 pgs.
Int'l Search Report and Written Opinion of the ISA/EP in PCT/US2014/040676; dated May 6, 2015; 16 pgs.
Int'l Search Report and Written Opinion of the ISA/EP in PCT/US2014/061141; dated Jun. 16, 2015; 13pgs.
Little, G., "Turkit: Tools for Iterative Tasks on Mechanical Turk," IEEE Symposium on Visual Languages and Human-Centric Computing; pp. 252-253; Sep. 20, 2009.
Liu et al. "A Broad-coverage Normalization System for Social Media Language," In Proc.of ACL; pp. 1035-1044; Jul. 2012.
Liu, et al., "Recognizing Named Entities in Tweets," In Proceedings of ACL-HLT; 1:359-367; Jun. 2011.
Lui, M. and Baldwin, T., "Accurate Language Identification of Twitter Messages," Proc. of the 5$^{th}$ Workshop on Language Analysis for Social Media (LASM)© EACL 2014; pp. 17-25; Apr. 26-30, 2014.

Lui, et al., "Automatic Detection and Language Identification of Multilingual Documents," Transactions of the Association for Computational Linguistics, 2:27-40; Feb. 2014.
Lui, M. and Baldwin, T., "Cross-domain Feature Selection for Language Identification," Proceedings of the 5$^{th}$ International Joint Conference on Natural Language Processing; pp. 553-561; Nov. 8-13, 2011.
Lui, M. and Baldwin, T., "langid.py: An Off-the-shelf Language Identification Tool," Proc. of the 50$^{th}$ Annual Meeting of the Association for Computational Linguistics; pp. 25-30; Jul. 8-14, 2012.
Monteith, et al., "Turning Bayesian Model Averaging Into Bayesian Model Combination," Proceedings of the International Joint Conference on Neural Networks IJCNN'11; Jul. 31-Aug. 5, 2011; 7pgs.
Papineni, K., et al. "BLEU: A Method for Automatic Evaluation of Machine Translation," Proc. 40th Annual Meeting on Assoc. for Computational Linguistics (ACL); Jul. 2002; pp. 311-318.
Popovic, et al., "Syntax-oriented Evaluation Measures for Machine Translation Output," Proc. of the Fourth Workshop on Statistical Machine Translation, pp. 29-32, Mar. 30-31, 2009.
Qureshi et al., Collusion Detection and Prevention with FIRE+ Trust and Reputation Model, 2010, IEEE, Computer and Information Technology (CIT), 2010 IEEE 10th International Conference, pp. 2548-2555; Jun. 2010.
Ritter, et al., "Named Entity Recognition in Tweets: An Experimental Study," In Proceedings of EMNLP;pp. 1524-1534; Jul. 2011.
Rouse, M., "Parallel Processing," Search Data Center.com; Mar. 27, 2007; 2pgs.
Shieber, S.M., and Nelken R., "Abbreviated Text Input Using Language Modeling." Natural Language Eng; 13(2):165-183; Jun. 2007.
Tromp, E. and Pechenizkiy, M., "Graph-based n-gram Language Identification on Short Texts," In Proceedings of the 20th Machine Learning Conference of Belgium and the Netherlands; May 2011; 8 pgs.
Vatanen, et al., "Language Identification of Short Text Segments with n-gram Models," In Proceedings of LREC; pp. 3423-3430; May 2010.
Vogel, J. and Tresner-Kirsch, D., "Robust Language Identification in Short, Noisy Texts: Improvements to LIGA," In Proceedings of the 3rd International Workshop on Mining Ubiquitous and Social Environments; pp. 1-9; Jul. 2012.
Xia, F. and Lewis, W.D., "Applying NLP Technologies to the Collection and Enrichment of Language Data on the Web to Aid Linguistic Research," Proc. of the EACL 2009 Workshop on Language Tech. and Resources for Cultural Heritage, Social Sciences, Humanities, and Education—LaTech—SHELT&R 2009; pp. 51-59; Mar. 2009.
Zaidan et al., "Crowdsourcing Translation: Professional Quality from Non-Professionals," Proceedings of the 49th Annual Meeting of the Association for Computational Linguistics, pp. 1220-1229, Portland, Oregon, Jun. 19-24, 2011.
"Arabic script in Unicode," accessed on the internet at <http://en.wikipedia.org/wiki/Arabic_script_in_Unicode>; downloaded Dec. 22, 2014; 18pgs.
"Chromium-compact-language-detector," accessed on the internet at <https://code.googie.com/p/chromium-compact-language-detector/>; downloaded Dec. 22, 2014; 1pg.
"CJK Unified Ideographs (Unicode block)," accessed on the internet at <http://en.wikipedia.org/wiki/CJK_Unified_Ideographs_(Unicode block)>; downloaded Dec. 22, 2014; 1pg.
"CJK Unified Ideographs," accessed on the internet at <http://en.wikipedia.org/wiki/CJK_Unified_Ideographs>; downloaded Dec. 22, 2014; 11pgs.
"Cld2," accessed on the internet at <https://code.google.com/p/cld2/>; downloaded Dec. 22, 2014; 2pgs.
"Cyrillic script in Unicode," accessed on the internet at <http://en.wikipedia.org/wiki/Cyrillic_script_in_Unicode>; downloaded Dec. 22, 2014; 22pgs.
"Detect Method," accessed on the internet at <http://msdn.microsoft.com/enus/library/ff512411.aspx>; downloaded Dec. 22, 2014; 5pgs.
"GitHub," accessed on the internet at <https://github.com/feedbackmine/language_detector>; downloaded Dec. 22, 2014; 1pg.

(56) References Cited

OTHER PUBLICATIONS

"Google Translate API," accessed on the internet at <https://cloud.qooqle.com/translate/v2/using_rest>; downloaded Dec. 22, 2014; 12pgs.

"ldig (Language Detection with Infinity Gram)," accessed on the internet at <https://github.com/shuyo/ldig>; downloaded Dec. 22, 2014; 3pgs.

"Language identification," accessed on the internet at <http://en.wikipedia.org/wiki/Language_identification>; downloaded Dec. 22, 2014; 5pgs.

"Languages and Scripts, CLDR Charts," accessed on the internet at <http://www.unicode.org/cldr/charts/latest/supplemental/languages_and_scripts.html>; downloaded Dec. 22, 2014; 23pgs.

"Latin Script in Unicode," accessed on the internet at <http://en.wikipedia.org/wiki/Latin_script_in_Unicode>; downloaded Dec. 22, 2014; 5pgs.

"Mimer SQL Unicode Collation Charts," accessed on the internet at <http://developer.mimer.com/charts/index.html>; downloaded Dec. 22, 2014; 2pgs.

"Multi Core and Parallel Processing," accessed on the internet at stackoverflow.com/questions/1922465/multi-core-and-parallel-processing, published Dec. 17, 2009; downloaded on Jun. 30, 2015; 2pgs.

"Scripts and Languages," accessed on the internet at <http://www.unicode.org/cldr/charts/latest/supplemental/scripts_and_languages.html>; downloaded Dec. 22, 2014; 23pgs.

"Supported Script," accessed on the internet at <http://www.unicode.org/standard/supported.html>; downloaded Dec. 22, 2014; 3pgs.

"Unicode Character Ranges," accessed on the internet at <http://jrgraphix.net/research/unicode_blocks.php>; downloaded Dec. 22, 2014; 1pg.

"Uscript.h File Reference," accessed on the internet at <http://icuproject.org/apiref/icu4c/uscript_8h.html>; downloaded Dec. 22, 2014; 34pgs.

U.S. Appl. No. 16/540,542, filed, Aug. 14, 2019, Systems and Methods for Multi-User Mutli-Lingual Communications (MZI-001C5), Leydon, et al.

U.S. Appl. No. 16/432,354, filed Jun. 5, 2019, Systems and Methods for Incentivizing User Feedback for Translation Processing (MZI-001CPC4), Leydon, et al.

U.S. Appl. No. 16/445,929, filed Jun. 19, 2019, Systems and Methods for Multi-User Multi-Lingual Communications (MZI-001CP2AC5) Leydon, et al.

U.S. Appl. No. 15/857, filed Dec. 29, 2017, Systems and Methods for Multi-User Multi-Lingual Communications (MZI-001CP2BC2) Orsini, et al.

U.S. Appl. No. 16/225,659, filed Dec. 19, 2018, Systems and Methods for Multi-User Multi-Lingual Communications (MZI-001CP2FC2) Orsini, et al.

U.S. Appl. No. 16/210,405, filed Dec. 5, 2018, Systems and Methods for Language Detection (MZI-007CPC1) Bojja, et al.

U.S. Appl. No. 16/135,493, filed Sep. 19, 2018, System and Method for Translating Chat Messages (MZI-080) Wang, et al.

"Bleu," accessed on the internet at: https://en.wikipedia.org/wiki/Bleu; downloaded Dec. 1, 2018; 5 pgs.

"Cloud Translation API documentation," accessed on the internet at:<https://cloud.google.com/translate.docs/>; downloaded Dec. 1, 2018; 2 pgs.

"Dakuten and handakuten," accessed on the internet at: https://en.wikipedia.org/wiki/Dakuten_and_handakuten>; downloaded Dec. 1, 2018; 4 pgs.

"Microsoft Translator Text API," accessed on the internet at: https://www.microsoft.com/en-us/translator/translatorapi.aspx; downloaded on Dec. 1, 2018.

Hakkinen, J., et al., "N-gram and Decision Tree Based Language Identification for Written Words," Automatic Speech Recognition and Understanding, 2001, ASRU '01, IEEE Workshop, Dec. 9, 2001, pp. 335-338.

Int'l Search Report and Written Opinion of the ISA/EP in PCT/US2017/054722; Jan. 10, 2018; 13 pgs.

Int'l Search Report and Written Opinion of the ISA/EP in PCT/US2018/051646; Jan. 4, 2019; 13 pgs.

Office Action (Translated) in Japanese Patent Application No. 2017-520499; dated Sep. 11, 2018; 9 pgs.

Takaaki, Mizuta, et al., "Language Identification Using Statistical Hypothesis Testing for Similar Languages," IPSJ SIG Technical Reports, JP, Information Processing Society of Japan, Nov. 19, 2008, vol. 2008, No. 113, pp. 91-98.

* cited by examiner

US 10,765,956 B2

NAMED ENTITY RECOGNITION ON CHAT DATA

BACKGROUND

This specification relates to language translation, and more particularly, to translation of online game chat messages to different languages.

Online chat is conversation among participants who exchange text messages transmitted over the Internet. A participant can join in a chat session from a user interface of a client software application (e.g., web browser, messaging application) and send and receive messages to and from other participants in the chat session.

Online games are electronic games that game participants play against each other or against a server computer over the Internet or other computer networks. A participant can join in a game session from a user interface of a client software application such as, for example, a web browser or a game application, that sends and receives game data (e.g., game states, user actions), and displays the game's graphics in the user interface. A game's user interface can also include a chat user interface in which a game participant can send and receive chat messages while interacting with the game. In a large-scale multi-player online game, many participants from multiple countries can join a game session and exchange chat messages in multiple languages. A chat message in one language can be automatically translated to another language using software. For example, participant A can send a message in English to participant B wherein it is automatically translated to French before being presented to participant B. Automatic language translation u is often referred as machine translation.

SUMMARY

In general, one aspect of the subject matter described in this specification can be embodied in methods that include the actions of performing by one or more computers, receiving a plurality of word strings in a first language, each received word string comprising a plurality of words, identifying one or more named entities in each received word string using a statistical classifier that was trained using training data comprising a plurality of features, wherein one of the features is a word shape feature that comprises a respective token for each letter of a respective word wherein each token signifies a case of the letter o or whether the letter is a digit, and translating the received word strings from the first language to a second language including preserving the respective identified named entities in each received word string during translation. Other embodiments of this aspect include corresponding systems, apparatus, and computer programs.

These and other aspects can optionally include one or more of the following features. Translating the received word strings from the first language to a second language can comprises, for a particular received word string, selecting a respective template in the first language, the respective template comprising one or more placeholders for the identified named entities and having a corresponding translated template in the second language that preserves the placeholders, and translating the particular received word string by substituting its identified named entities in the placeholders in the corresponding translated template in the second language. The respective template in the first language can further comprise words in the first language that are translated, according to a dictionary, to words in the second language in the corresponding translated template. The dictionary can comprise words in the first language, and one or more words in the second language corresponding to each of the words in the first language. The respective template in the first language can further comprise a particular word which count in the particular received word string exceeds a specified threshold. A particular named entity can comprise one or more proper nouns. The plurality of features can further comprise one or more of the following features: prefix, suffix, part-of-speech tag, and word type. The word type feature of a particular word can describe whether the word shape feature of the particular word comprises tokens of a same type. A particular feature can be identified with an n-gram within an m-length window, wherein m is greater than n. The statistical classifier can be specific to the first language. The statistical classifier can comprise a conditional random field classifier that is configured to identify one or more named entities in a word string.

Particular implementations of the subject matter described in this specification can be implemented to realize one or more of the following advantages. The system described herein receives mobile game chat messages in a first language. The system identifies named entities in each received messages by using a statistical classifier. The statistical classifier was trained with training data including a set of features. A particular feature in the training data is a word shape feature that identifies a shape of a word. A word's shape feature can be described using tokens that signify whether each letter of the word is an upper case letter, lower case letter, digit, or symbol. The word shape feature is useful in identifying named entities in mobile game chat messages as named entities in mobile game chat messages are often not of proper nouns, but have common word shapes. After identifying named entities in the received chat messages, the system translates the received chat messages to a second language while preserving the identified named entities during translation, as translation is mostly not needed for the identified named entities.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
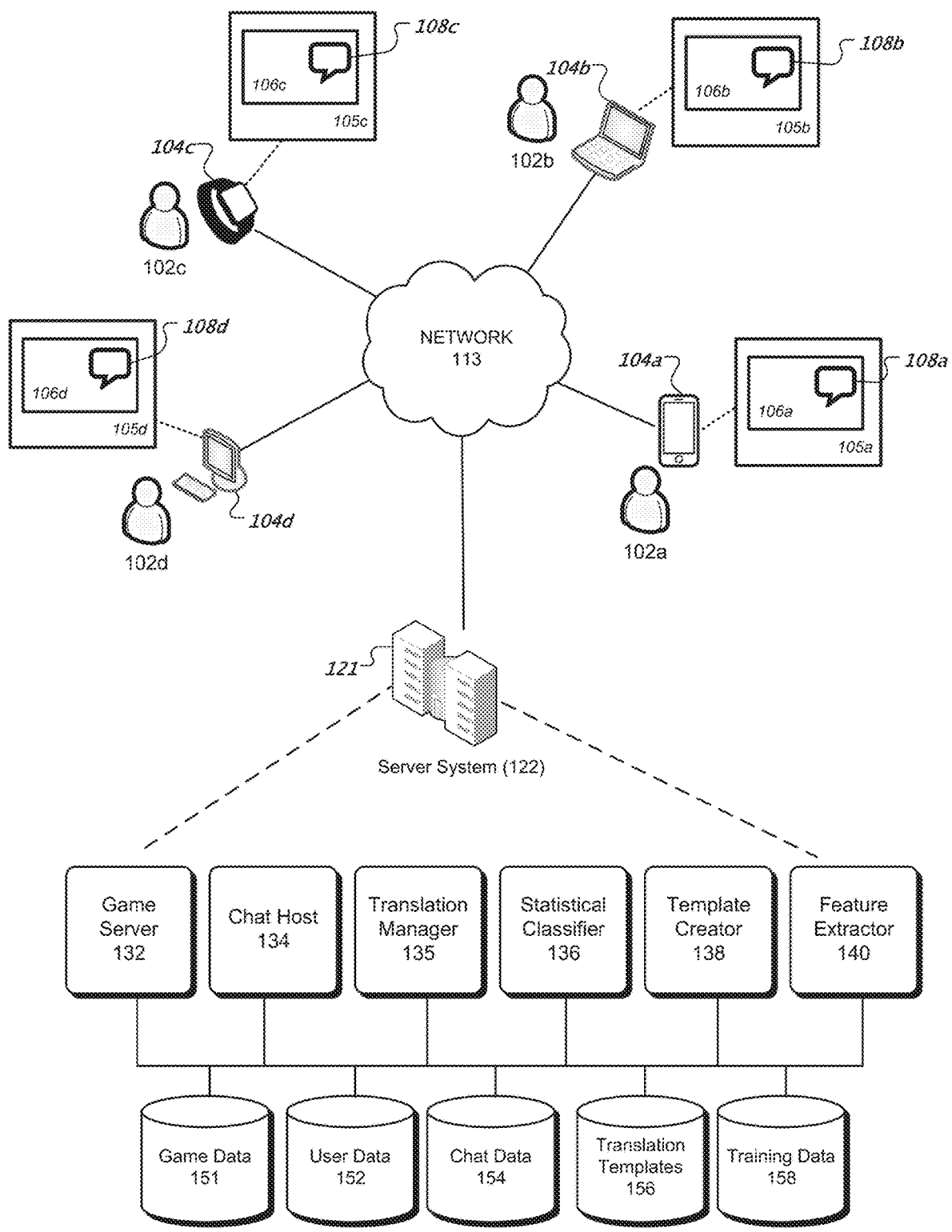
FIG. 1 illustrates an example system for online games.

FIG. 1 illustrates an example system for online games. In FIG. 1, a server system 122 provides functionality for online game chat translation. The server system 122 comprises software components and databases that can be deployed at one or more data centers 121 in one or more geographic locations, for example. The server system 122 software components comprise a game server 132, chat host 134, translation manager 135, statistical classifier 136, template creator 138, and feature extractor 140. The server system 122 databases comprise a game data database 151, user data database 152, chat data database 154, translation templates database 156, and training data database 158. The databases can reside in one or more physical storage systems. The software components and databases will be further described below.

In FIG. 1, a client device (e.g., 104*a*, 104*b*, and so on) of an online game player or user (e.g., 102*a*, 102*b*, and so on) can connect to the server system 122 through one or more data communication networks 113 such as the Internet, for example. A client device as used herein can be a smart phone, a smart watch, a tablet computer, a personal computer, a game console, or an in-car media system. Other examples of client devices are possible. Each user can access (play) one or more online games hosted by the game server 132 through a graphical user interface (e.g., 106*a*, 106*b*, and so on) of a client software application (e.g., 105*a*, 105*b*, and so on) running on the user's client device. The client software application can be a web browser or a special-purpose software application such as a game application. Other types of a client software application for accessing online games hosted by the game server 132 are possible. In addition, a game's graphical user interface (e.g., 106*a*, 106*b*, and so on) can comprise a chat user interface (e.g., 108*a*, 108*b*, and so on). A user (e.g., 102*a*), while playing an online game, can interact ("chat") with other users (e.g., 102*b*, 102*d*) of the online game by joining a chat session of the game, and sending and receiving messages in the chat user interface (e.g., 108*a*) in the game's user interface (e.g., 106*a*).

The game server 132 is a server system that hosts one or more online games. The game server 132 can send the most recent game data of an online game (e.g., the current state of the game) to users (players) participating in the game, to be displayed in the users' respective graphical user interfaces (e.g., 106*a*, 106*b*). The game server 132 can receives from a user's user action from the user's client device (e.g., 104*d*) and update the game's state, for example. The game server 132 can store a game's current state and identifiers of users participating in the game in the game data database 151. The game server 132 can also store a user's data (e.g., an identifier, language setting, games played) in the user data database 152.

The chat host 134 is a software component that establishes and maintains chat sessions between users of online games hosted by the game server 132. The chat host 134 can receive a message sent from a user (e.g., 102*d*) and send the message to one or more recipients (e.g., 102*a*, 102*c*), and store the message in the chat data database 154. If a sender and a recipient of a chat message have different language settings (e.g., stored in the user data database 152), the translation manager 135 can first translate the message from the sender's language to the recipient's language. The chat host 134 then can send the translated message to the recipient, for example. The chat host 134 can also store the translated message in the chat data database 154. The translation manager 135 can translate a message from one language to another language using one or more machine translation methods (e.g., by accessing a machine translation software program via an application programming interface or API). Examples of machine translation methods include rules (e.g., linguistic rules) and dictionary based machine translation, and statistical machine translation. A statistical machine translation can be based on a statistical model that predicts a probability of a text string in one language ("target") is a translation from another text string in another language ("source").

A named entity in a message or sentence is a name of a person (e.g., John Smith), place (e.g., San Francisco, Seattle), or organization (e.g., MICROSOFT). During translation of a message from one language to another language, name entities in the message can be preserved without translation while rest of the message is translated to the other language. One exception can be a country name (e.g., "Germany" in English can be translated to "Deutschland" in German). In a sentence or paragraph in formal English (e.g., written as adhering to English grammar), named entities can be readily identified as they are usually proper nouns and are capitalized in the first letters or in entire words, or can be readily identified from a dictionary or from the context of the sentence. However, in chat messages of online games name entities can be difficult to identify for at least the following reasons:

Chat messages are often of free format (or lack of format).

Chat messages often are short and lacks of sufficient context.

Chat messages often contain spelling errors (typos).

Chat messages often contain chatspeak words (e.g., slang, abbreviation, or a combination of alphabets, digits, symbols, or emojis) that are specific to text messaging, or specific to a particular online game.

Chat messages of online games often contain common nouns (e.g., wolf, queen, conqueror) used to present game players (e.g., as pseudo names).

Chat messages often contain emoticons and emojis.

By way of illustration, example chat messages from online games are listed below, with name entities are underlined in each message.

<u>Benin</u> here?

Bye <u>ghost</u>

Good morning <u>john</u>.

And owner said they were joint to attack me but <u>mgt</u> backed down

<u>Scotch</u> knows my plan now.

LOL <u>CnD</u> failed r u there <u>bob1</u>?

Heading to <u>SanFrancisco</u>!

i've met <u>rich</u> b4

As shown in the above examples, an online game chat message can be a word string (a string of words). Each word can be a character string bordered by spaces or other delimiters (e.g., punctuation marks). A named entity in an online game chat message can be a word (or multiple adjacent words) related to a person, place, or organization. Named entities in online game chat messages are not necessarily proper nouns, or capitalized correctly. A named entity in an online game chat message can be an abbreviation. A named entity in an online game chat message can include digits, symbols, emoticons, or emojis. A named entity in an online chat message can be a word including a string of letters, with more than one but not all letters being upper case letters.

Particular implementations described herein describe methods for translating online game chat messages. Particular implementations use a statistical classifier for identifying named entities in online game chat messages. Other types of classifiers are contemplated, however. More particularly, the statistical classifier uses a statistical classification model that was trained using training data including a set of features. A particular feature is a word shape feature that uses tokens each signifying a case of a letter of a word, or whether the letter is a digit, in an online game chat message, as described further below.

The statistical classifier 136 is a software component that uses a statistical classification model to identify named entities in online game chat messages. For instance, the statistical classification model can be based on a conditional random field classification algorithm to identify named entities in online game chat messages.

The statistical classifier 136 can be trained with a training set of online game chat messages. For instance, the statistical classifier 136 can be trained with a set of 10,000 chat messages in English stored in the chat data database 154. The training messages can be processed and translated (e.g., by the translation manager 135 or another software component of the server system 122) to another language such as French using software applications such as a rules and dictionary based translation software application. The dictionary can generally map a word or phrase (two or more words) in English to a French word or phrase, for example. The translation can be further examined and updated by a person.

The template creator 138 is a software component that creates translation templates from the training messages. The template creator 138 creates a translation template by first tagging named entities in a training message. For example, the template creator 138 can tag a particular word in a training message as a named entity if the particular word is not a "stop word" such as a common verb (e.g., be, do, make) that appears in the training message for more than a threshold number of times (e.g., three times), or if the particular word is not translated using the dictionary. The template creator 138 then creates a translation template in English and its corresponding template in French by replacing tagged words (named entities) in the training message with placeholders, for example. For instance, the template creator 138 can tag the word "John" as a named entity in a training message "John, what's new?" and its French translation "John, quoi de neuf?." The template creator 138 then replaces the tagged word with a place holder and creates a translation template "$placeholder, what's new?" in English and a corresponding template "$placeholder, quoi de neuf?" in French. The template creator 138 can store the created templates in the translation templates database 156. When later on translating a message "Julie, what's new?" from English to French, the translation manager 135 can determine that the message matches the English translation template "$placeholder, what's new?" stored in the translation manager 135. The translation manager 135 then translates the message "Julie, what's new?" from English to French by using the template in French while preserving the name entity "Julie" (i.e., replacing the place holder with the named entity "Julie"): "Julie, quoi de neuf?." Translation templates created by the template creator 138 can be further examined and updated by a person.

The feature extractor 140 is a software component that identifies features in a training message. For example, the feature extractor can identify a feature of word shape of words in the training message. The word-shape feature uses one or more tokens that signify whether a letter in a word is an upper case, lower case, digit, or a symbol. For instance, a token can be "U" for an upper case letter, "L" for a lower case letter, or "D" for a digit. Other types of tokens for the word-shape feature are possible. For instance, a word "Ben" can be specified by tokens "ULL." A word "AnD" can be specified by tokens "ULU." A word "here" can be specified by tokens "LLLL." The word-shape feature can be useful if named identifies in the training data (thus for the online game chat messages in general) if a particular type of sequence of tokens (e.g., "ULU") typically represents a particular type of named entities appearing in the training data. A word type feature can describe whether a word in a training message comprises tokens of the same type. For instance, a word type feature can be whether a word comprises all upper case, all digits, all symbols, all upper case and digits, all upper case and symbols, all digits and symbols, and so on.

Other features are possible for a word in a training message. For instance, a feature can describe a word's prefix or suffix. A feature can also describe a word's part-of-speech tag that indicates the word's grammatical function in a training message containing the word. For instance, a part-of-speech tag can be NNP for a proper noun, IN for a preposition, NN for a noun, VB for a verb in base form, VBD for a verb in past tense, and so on. The following table lists example features for words in the training messages. The example features are described in reference to a training message "Ben in here?"

In the following table, a feature of a training message can be identified with an n-gram within an m-gram window, where m can be greater than n. Here, an n-gram is a continuous sequence of n items from a given sequence of text. For instance, the feature word u example in the following table denotes a word unigram (1-gram or one word) in a window of 5-gram (5 words).

| Feature Name | Feature Description | Examples |
|---|---|---|
| word_u | The current word unigram collected in the window of length 5 | "Ben", "in", "here", "?" |
| word_1_u | The lowercased word unigrams collected in the window of length 5 | "ben", "in", "here", "?" |
| pos_n | The part-of-speech tag unigram for | "NNP", "IN", "NN", "?" |
| char_n_gram_prefix | Character prefix n-grams of length 6 for the current word | "B", "Be", "Ben", . . . |
| char_n_grams_suffix | Character suffix n-grams of length 6 for the current word | "n", "en", "Ben" |
| word_b | The current word bigram collected in the window of len 5 | "Ben\|in", "in\|here" |
| pos_b | The current word bigram collected in the window of len 5 | "NNP\|IN", "IN\|NN" |
| shaped_b | Degenerate shape of a word is the type of characters in the word. Bigrams of this property is used in window of 5 | "UL\|L", "L\|L", "L\|?" |
| type_b | Type of a word also describes the nature of word based on the characters. Bigrams of this property in used in window of 5. Can contain multiple value | "InitUpper, AllLetter\| AllLetter", . . . |
| word_t | The current word trigram collected in the window of len 5 | "Ben\|in\|here", |
| pos_t | The current word trigram collected in the window of len 5 | "NNP\|IN\|NN" |

The feature extractor 140 can extract one or more features for each training message of the training set, and store the extracted features with the training message in the training data database 158. The extracted features can be examined and update by a person.

The statistical classifier 136 can train on the training data stored in the training data database 158. For instance, the statistical classifier 136 can use a conditional random field model as a statistical classification model. The conditional random field model is a statistical method that models a conditional probability distribution p(Y|X) of a random variable Y given a condition of X (i.e., X is known). For instance, X can be a chat message and Y can be a particular word in the chat message X. p(Y|X) can be a probability that Y is a named entity given the chat message X. The statistical classifier 136 can run (e.g., perform operations of) an algorithm implementing the conditional random field model with the training data and its extracted features as input to the algorithm. The statistical classifier 136 can run (i.e., train) the algorithm until parameters of the conditional random field model are determined (e.g., when a value of each parameter converges within a specified threshold after iterations using a gradient descent method).

For instance, each extracted feature in a training message can correspond to a feature function $f_j$ in the conditional random field model. The feature function $f_j$ can be a conditional probability function that describes a probability associated with the extracted feature for a particular word (or words) in a training message given one or more conditions. For instance, the conditional probability function can describe a probability that the particular word having the extracted feature is a named entity given a condition in the particular word's location in the training message, or the particular's location relative to another word (e.g., a verb, a greeting word, or a word with another extracted feature) in the training message. Other conditions for the conditional probability function are possible. The model can calculate a score predicting whether the particular word is a named entity by a weighted summation of the feature functions:

$$\text{score} = \Sigma \lambda_j \cdot f_j$$

Here, parameters of the model $\lambda_j$'s are respective weights for the feature functions in the model. The summation can be added over all extracted features in the training message. The summation can also be added over all words in the training message. Other formulations of the conditional random field model are possible.

Since the statistical classification model can be trained on different sets of training data (chat messages) in different languages, the model can be different (e.g., with different sets of parameters) for chat messages in different languages.

Figure 2:
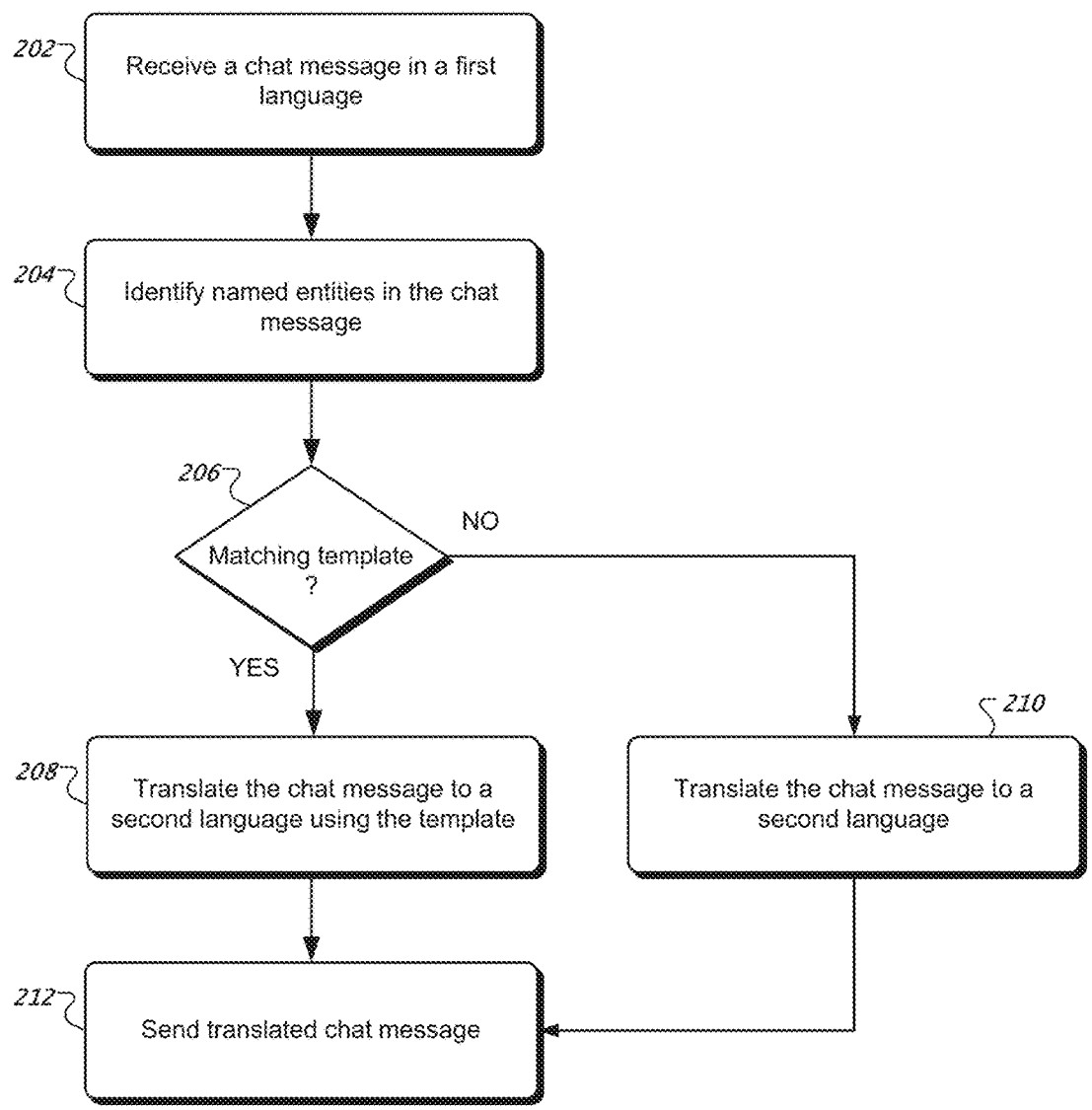
FIG. 2 is a flowchart of an example method for online game chat translation.

The server system 122 can translate new online game chat messages using the trained statistical classification model and the translation templates stored in the translation templates database 156 described above. FIG. 2 is a flowchart of an example method for online game chat translation. For example, the chat host 136 receives a chat message (e.g., a word string) from a first user (Step 202). The chat host 136 determines that the chat message is composed in English and is intended for a second user in French. The chat host 136 passes the chat message and an instruction to translate the chat message from English to French, to the translation manager 135. The translation manager 135 sends a request to the statistical classifier 136 to identify one or more named entities in the chat message. The statistical classifier 136 can use the trained statistical classification model to identify one or more named entities in the chat message (Step 204). For instance, the statistical classifier 136 can provide the chat message as input to the trained statistical classification model, which in turn outputs one or more named entities in the chat message. The statistical classifier 136 then returns the identified named entities to the translation manager 135.

The translation manager 135 then, based on the identified name entities, access the translation templates 156 for a possible matching template for the chat message (Step 206). If a matching template is found, the translation manager 135 translates the chat message to French by inserting the identified named entities to placeholders (for named entities) in the corresponding French template of the matching English template (Step 208). Note that using the matching template (stored or cached in the translation templates database 156) can reduce computation time as no translation (e.g., by accessing a translation software application through an API) is needed for the named entities and the rest of the chat message.

If no matching template is found, the translation manager 135 can translate the chat message to French by accessing a English-to-French machine translation software through an API, for example (Step 210). The translation manager 135 can provide an instruction to the translation software to preserve the identified named entities during translation (e.g., skipping translation for the identified named entities). Here, as described earlier, the template creator 138 can create a new translation template in English and in French by replacing the identified name entities with place holders in the chat message in English and its translation in French, and store the new translation template in the translation templates database 156 for later use.

The translation manager 135 can pass the translated chat message (in French) to the chat host 134. The chat host then sends the translated chat message to the second user (Step 212).

Figure 3:
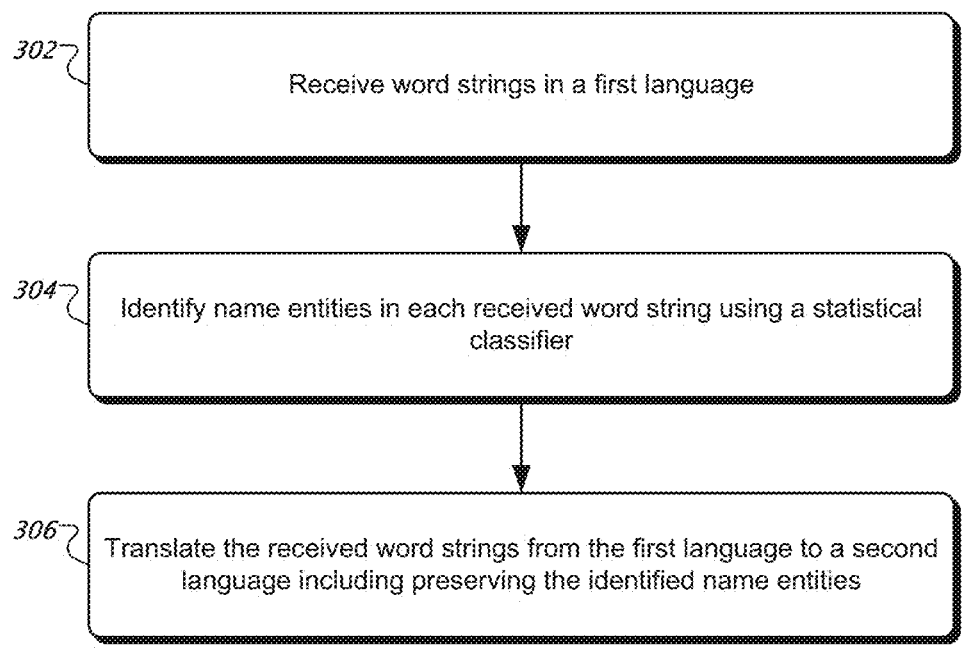
FIG. 3 is a flowchart of another example method for online game chat translation.

FIG. 3 is a flowchart of another example method for online game chat translation. The method can be implemented using software components of the server system 122, for example. The method begins by receiving a plurality of word strings (e.g., chat messages) in a first language, each received word string comprising a plurality of words (Step 302; e.g., chat host 134). The method identifies one or more named entities in each received word string using a statistical classifier that was trained using training data comprising a plurality of features, wherein one of the features is a word shape feature that comprises a respective token for each letter of a respective word wherein each token signifies a case of the letter or whether the letter is a digit (Step 304; e.g., statistical classifier 136). The method translates the received word strings from the first language to a second language including preserving the respective identified named entities in each received word string during translation (Step 306; e.g., translation manager 135).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a smart phone, a smart watch, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising
performing by one or more computers:
training a statistical classifier to identify named entities using training data comprising a plurality of features, wherein one of the features is a word shape feature that comprises a respective token for each letter of a respective word, the respective token indicating that each letter of the respective word is one of an upper case letter, a lower case letter, and a digit;
receiving a plurality of word strings in a first language, each received word string comprising a plurality of words;
identifying at least one named entity in each received word string using the trained statistical classifier; and
translating the received word strings from the first language to a second language, wherein translating comprises preserving the identified at least one named entity in the first language.

2. The method of claim 1 wherein translating the received word strings from the first language to a second language comprises:
for a particular received word string:
selecting a respective template in the first language, the respective template comprising one or more placeholders for the identified named entities and having a corresponding translated template in the second language that preserves the placeholders; and
translating the particular received word string by substituting its identified named entities in the placeholders in the corresponding translated template in the second language.

3. The method of claim 2 wherein the respective template in the first language further comprises words in the first language that are translated, according to a dictionary, to words in the second language in the corresponding translated template.

4. The method of claim 3 wherein the dictionary comprises:
words in the first language; and
one or more words in the second language corresponding to each of the words in the first language.

5. The method of claim 2 wherein the respective template in the first language further comprises a particular word which count in the particular received word string exceeds a specified threshold.

6. The method of claim 1, wherein a particular named entity comprises one or more proper nouns.

7. The method of claim 1 wherein the plurality of features further comprises one or more of the following features: a prefix, a suffix, a part-of-speech tag, and a word type.

8. The method of claim 7, wherein the word type feature of a particular word describes whether the word shape feature of the particular word comprises tokens of a same type.

9. The method of claim 1 wherein a particular feature is identified with an n-gram within an m-length window, wherein m is greater than n.

10. The method of claim 1 wherein the statistical classifier is specific to the first language.

11. The method of claim 1 wherein the statistical classifier comprises a conditional random field classifier that is configured to identify at least one named entity in a word string.

12. A system comprising
one or more computers programmed to perform operations comprising:
training a statistical classifier to identify named entities using training data comprising a plurality of features, wherein one of the features is a word shape feature that comprises a respective token for each letter of a respective word, the respective token indicating that each letter of the respective word is one of an upper case letter, a lower case letter, and a digit;
receiving a plurality of word strings in a first language, each received word string comprising a plurality of words;
identifying at least one named entity in each received word string using the trained statistical classifier; and
translating the received word strings from the first language to a second language, wherein translating comprises preserving the identified at least one named entity in the first language.

13. The system of claim 12 wherein translating the received word strings from the first language to a second language comprises:
for a particular received word string:
selecting a respective template in the first language, the respective template comprising one or more placeholders for the identified named entities and having a corresponding translated template in the second language that preserves the placeholders; and
translating the particular received word string by substituting its identified named entities in the placeholders in the corresponding translated template in the second language.

14. The system of claim 13 wherein the respective template in the first language further comprises words in the first language that are translated, according to a dictionary, to words in the second language in the corresponding translated template.

15. The system of claim 14 wherein the dictionary comprises:
 words in the first language; and
 one or more words in the second language corresponding to each of the words in the first language.

16. The system of claim 13 wherein the respective template in the first language further comprises a particular word which count in the particular received word string exceeds a specified threshold.

17. The system of claim 12, wherein a particular named entity comprises one or more proper nouns.

18. The system of claim 12 wherein the plurality of features further comprises one or more of the following features: a prefix, a suffix, a part-of-speech tag, and a word type.

19. The system of claim 18, wherein the word type feature of a particular word describes whether the word shape feature of the particular word comprises tokens of a same type.

20. The system of claim 12 wherein a particular feature is identified with an n-gram within an m-length window, wherein m is greater than n.

21. The system of claim 12 wherein the statistical classifier is specific to the first language.

22. The system of claim 1 wherein the statistical classifier comprises a conditional random field classifier that is configured to identify at least one named entity in a word string.

23. A storage device having instructions stored thereon that when executed by one or more computers perform operations comprising:
 training a statistical classifier to identify named entities using training data comprising a plurality of features, wherein one of the features is a word shape feature that comprises a respective token for each letter of a respective word, the respective token indicating that each letter of the respective word is one of an upper case letter, a lower case letter, and a digit;
 receiving a plurality of word strings in a first language, each received word string comprising a plurality of words;
 identifying at least one named entity in each received word string using the trained statistical classifier; and
 translating the received word strings from the first language to a second language, wherein translating comprises preserving the identified at least one named entity in the first language.

24. The storage device of claim 23 wherein translating the received word strings from the first language to a second language comprises:
 for a particular received word string:
  selecting a respective template in the first language, the respective template comprising one or more placeholders for the identified named entities and having a corresponding translated template in the second language that preserves the placeholders; and
  translating the particular received word string by substituting its identified named entities in the placeholders in the corresponding translated template in the second language.

25. The storage device of claim 24 wherein the respective template in the first language further comprises words in the first language that are translated, according to a dictionary, to words in the second language in the corresponding translated template.

26. The storage device of claim 25 wherein the dictionary comprises:
 words in the first language; and
 one or more words in the second language corresponding to each of the words in the first language.

27. The storage device of claim 24 wherein the respective template in the first language further comprises a particular word which count in the particular received word string exceeds a specified threshold.

28. The storage device of claim 23, wherein a particular named entity comprises one or more proper nouns.

29. The storage device of claim 23 wherein the plurality of features further comprises one or more of the following features: a prefix, a suffix, a part-of-speech tag, and a word type.

30. The storage device of claim 29, wherein the word type feature of a particular word describes whether the word shape feature of the particular word comprises tokens of a same type.

\* \* \* \* \*